United States Patent

Sadahiro

(10) Patent No.: US 7,555,063 B2
(45) Date of Patent: Jun. 30, 2009

(54) MOBILE TERMINAL AND DATA RECEPTION METHOD FOR THE SAME

(75) Inventor: Tomoaki Sadahiro, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 631 days.

(21) Appl. No.: 11/236,105

(22) Filed: Sep. 26, 2005

(65) Prior Publication Data

US 2006/0067445 A1 Mar. 30, 2006

(30) Foreign Application Priority Data

Sep. 27, 2004 (JP) ............................. 2004-280057

(51) Int. Cl.
*H03K 9/00* (2006.01)
(52) U.S. Cl. ...................... 375/316; 455/561
(58) Field of Classification Search ................. 375/267, 375/316, 345, 347; 455/442, 561, 575.7
See application file for complete search history.

(56) References Cited

U.S. PATENT DOCUMENTS

2003/0153358 A1* 8/2003 Moon et al. ................. 455/561
2004/0151122 A1* 8/2004 Lau et al. .................... 370/252
2004/0219959 A1* 11/2004 Khayrallah et al. ...... 455/575.7
2004/0253955 A1* 12/2004 Love et al. .................. 455/442

FOREIGN PATENT DOCUMENTS

| JP | 2002-344560 | 11/2002 |
|---|---|---|
| JP | 2002-369247 | 12/2002 |
| WO | 03/088521 | 10/2003 |

* cited by examiner

*Primary Examiner*—Chieh M. Fan
*Assistant Examiner*—Freshteh N Aghdam
(74) *Attorney, Agent, or Firm*—Hogan & Hartson LLP

(57) ABSTRACT

To provide a mobile terminal controlling suitably whether or not a diversity reception should be performed to realize low power consumption, and a data reception method for the same, wherein a mobile phone, when performing a data communication from a server apparatus via a communication network and a base station, decides a necessary and sufficient data rate ODR0 based on a transfer data including an amount of data received and downloaded from the base station and a pilot strength Ec/Io to be an index of a reception status, and judges whether or not the diversity reception should be performed based on a comparison result between the ODR0 and DRC which is the maximum data rate receivable at error rate less than a predetermined value.

12 Claims, 9 Drawing Sheets

FIG. 7

| PRESENT RECEPTION STATUS Ec/Io | AMOUNT OF TRANSFER DATA (BYTES) | ODR0 | CIR FLUCTUATION | DRC | ODR1 | REQ_DIV |
|---|---|---|---|---|---|---|
| A: EXCELLENT | > 1.0M | 500Kpbs | UPWARD TREND HIGH LEVEL | > 500Kbps | 500Kbps | NO |
| | | | | < 500Kbps | DRC | NO |
| | | | DOWNWARD TREND UNSTABLE LOW LEVEL | > 500Kbps | 500Kbps | NO |
| | | | | > 500Kbps | DRC | NO |
| | 500K TO 1.0M | 300Kbps | UPWARD TREND HIGH LEVEL | > 300Kbps | 300Kbps | NO |
| | | | | < 300Kbps | DRC | NO |
| | | | DOWNWARD TREND UNSTABLE LOW LEVEL | > 300Kbps | 300Kbps | NO |
| | | | | < 300Kbps | DRC | NO |
| | 0 TO 500K | 150Kbps | UPWARD TREND HIGH LEVEL | > 150Kbps | 150Kbps | NO |
| | | | | < 150Kbps | DRC | NO |
| | | | DOWNWARD TREND UNSTABLE LOW LEVEL | > 150Kbps | 150Kbps | NO |
| | | | | < 150Kbps | DRC | NO |
| B: GOOD | > 1.0M | 300Kbps | UPWARD TREND HIGH LEVEL | < 300Kbps | 300Kbps | NO |
| | | | | > 300Kbps | DRC | YES |
| | | | DOWNWARD TREND UNSTABLE LOW LEVEL | < 300Kbps | 300Kbps | NO |
| | | | | > 300Kbps | DRC | YES |
| | 500K TO 1.0M | 200Kbps | UPWARD TREND HIGH LEVEL | < 200Kbps | 200Kbps | NO |
| | | | | > 200Kbps | DRC | YES |
| | | | DOWNWARD TREND UNSTABLE LOW LEVEL | < 200Kbps | 200Kbps | NO |
| | | | | > 200Kbps | DRC | YES |
| | 0 TO 500K | 150Kbps | UPWARD TREND HIGH LEVEL | < 150Kbps | 150Kbps | NO |
| | | | | > 150Kbps | DRC | YES |
| | | | DOWNWARD TREND UNSTABLE LOW LEVEL | > 150Kbps | 150Kbps | NO |
| | | | | < 150kbps | DRC | YES |

FIG. 8

| DATA RATE | RCS | | CURRENT CONSUMPTION |
|---|---|---|---|
| | GAIN STEP SETTING | REFERENCE CURRENT ADJUSTMENT | |
| A | GAIN_0 | REF_0 | I_0_R0 |
| B | GAIN_0 | REF_1 | I_0_R1 |
| C | GAIN_0 | REF_2 | I_0_R2 |
| D | GAIN_1 | REF_0 | I_1_R0 |
| F | GAIN_1 | REF_1 | I_1_R1 |
| G | GAIN_1 | REF_2 | I_1_R2 |
| H | GAIN_1 | REF_3 | I_1_R3 |
| I | GAIN_2 | REF_0 | I_2_R0 |
| J | GAIN_2 | REF_1 | I_2_R1 |
| K | GAIN_2 | REF_2 | I_2_R2 |
| L | GAIN_2 | REF_3 | I_2_R3 |
| M | GAIN_2 | REF_4 | I_2_R4 |
| ⋮ | ⋮ | ⋮ | ⋮ |

MOBILE TERMINAL AND DATA RECEPTION METHOD FOR THE SAME

BACKGROUND OF THE INVENTION

1. Field of the Invention

The present invention relates to a mobile terminal, for example, typified by a mobile phone, a data reception method for the same, and a program.

2. Description of the Related Art

As a high-speed wireless communication method for a mobile terminal, for example, typified by a mobile phone, cdma2000 1x-EV DO method has been developed recently. The cdma2000 1x-EV DO method is standardized by Association of Radio Industries and Businesses (ARIB) in Std. T64 IS-2000 C. S. 0024 "High Rate Packet Data Air Interface Specification", specializing in a data communication in contrast with cdma2000 1x method in order to improve a data rate. Note that, in the cdma2000 1x-EV DO method, "evolution data only" is abbreviated to "EV DO".

In the cdma2000 1x-EV DO method (hereinafter, abbreviated to an "EVDO method"), a configuration of an upward wireless interface (transmission from a mobile terminal to a base station) applies a quadrature phase shift keying (QPSK) as a modulation method and a code division multiple access (CDMA) as a multiplexing method. The configuration is almost similarly to that of the cdma2000 1x method (hereinafter, abbreviated to a "1x method").

A configuration of a downward wireless interface (transmission from the base station to the mobile terminal) in the EVDO method greatly differs from the 1x method. Namely, the modulation method is applied with QPSK, 8-position quadrature phase shift keying (8PSK), or 16-position phase amplitude modulation (16QAM) depending on a reception status of the mobile terminal. The multiplexing method is applied with time division multiplex access (TDMA), not CDMA.

TDMA divides time into 1/600 second time unit. Only a single mobile terminal (hereinafter, abbreviated to a terminal) can communicate in the unit time. TDMA switches communication of a plurality of terminals every unit time. Consequently, a data communication can be performed with the maximum power for each of terminals, which allows the data communication between terminals to perform with high speed.

The TDMA, in stark contrast with the conventional personal digital cellular (PDC), determines a terminal that communicates in every slot (scheduling) in the base station side.

In the EVDO method, the better a reception status of a terminal side is, the higher reception data can be achieved. Further, depending on the scheduling, the better the reception status is, the more likely a reception slot is assigned. Therefore, the reception status largely affects throughput. The better the reception status is, the higher the throughput can be obtained. This is a great advantage of the EVDO method. It has a further advantage that mix of signals received from a plurality of antennas allows sensitivity to improve.

In the mobile terminal performing high-speed communication such as the EVDO method described above, a variety of improved technologies has been developed.

For example, Japanese Unexamined Patent Publication (Kokai) No. 2002-369247 discloses a technology concerning a slot assignment for utilizing transmission ability of a base station efficiently. Japanese Unexamined Patent Publication (Kokai) No. 2002-344560 discloses a technology optimizing an error rate and a data rate (communication rate) in a downward data communication.

As one of technologies for avoiding influence of phasing to improve a reception status, diversity reception is applied. The diversity reception (antenna diversity) selects or mixes signals received from a plurality of antennas, hence, achieves a reception signal with a strong signal strength at various conditions.

However, the diversity reception requires a plurality of antennas and reception systems. Therefore, power consumes more than that without diversity reception.

Further, in the mobile terminal able to perform the diversity reception, which applies for example, EVDO method, a further reduction of the power consumption has been demanded.

SUMMARY OF THE INVENTION

An object of the present invention is to provide a mobile terminal securing a necessary communication rate by suitably controlling whether or not a diversity reception should be performed and realizing low power consumption, and a data reception method for the same.

According to a first aspect of the present invention, there is provided a mobile terminal having a plurality of reception systems; a first calculating unit for calculating a reception status data based on reception signals received through the plurality of reception systems; a second calculating unit calculating a first data rate as a predicted data rate based on the reception status data; and a reception controlling unit for controlling whether or not a diversity reception should be performed based on the reception signals. The reception controlling unit does not perform the diversity reception when the first data rate reaches a predetermined second data rate.

Preferably, the reception controlling unit obtains an amount of data received from a network and changes the second data rate based on the amount of data.

Preferably, the reception controlling unit changes the second data rate based on the reception status data.

Preferably, the reception controlling unit requests a network for data transmission at the second data rate when the first data rate reaches the second data rate.

Preferably, the reception controlling unit, when the first data rate does not reach the second data rate, judges whether or not strength of the reception signal increases by performing the diversity reception based on the reception status data.

Preferably, the reception controlling unit, when the strength of the reception signal does not increase by performing the diversity reception, does not perform the diversity reception.

Preferably, the reception system includes an amplifier amplifying the reception signal, and the reception controlling unit includes a gain setting part for setting a gain with a plurality of steps to the amplifier and a reference signal adjusting part for adjusting the reference signal of the amplifier and changing an output signal of the amplifier.

Preferably, the reception controlling unit adjusts the reference signal of the amplifier so that the first data rate and the second data rate are equal when the first data rate does not reach the second data rate, and requests the network for data transmission at the second data rate when the first data rate reaches the second data rate.

Preferably, the reception controlling unit, when the strength of the reception signal increases by performing the diversity reception, calculates a third data rate as a predicted data rate based on the reception status data in performing the diversity reception, and judges whether or not the third data rate reaches the second data rate.

The reception system includes the amplifier amplifying the reception signal. The reception controlling unit includes: the gain setting part for setting the gain with a plurality of steps to the amplifier; and the reference signal adjusting part for adjusting the reference signal of the amplifier and changing the output signal of the amplifier. When the third data rate does not reach the second data rate, the reception controlling unit adjusts the reference signal of the amplifier so that the third data rate and the second data rate are equal, and requests the network for data transmission at the second data rate.

According to a second aspect of the present invention, there is provided a data reception method for a mobile terminal having a plurality of reception systems to perform a diversity reception, the method having the steps of: calculating a reception status data based on a reception signal; calculating a first data rate as a predicted data rate based on the reception status data; judging whether or not the first data rate reaches a predetermined second data rate; requesting a network for data transmission at the second data rate without the diversity reception when the first data rate reaches the second data rate; and receiving the data from the network.

Preferably, the data reception method for a mobile terminal further has a step of judging whether or not strength of the reception signal increases by performing the diversity reception based on the reception status data, when the first data rate does not reach the second data rate.

According to a third aspect of the present invention, there is provided a program for a mobile terminal having a plurality of reception systems to perform a diversity reception, the program that causes the computer to execute the steps of: calculating a reception status data based on a reception signal; calculating a first data rate as a predicted data rate based on the reception status data; judging whether or not the first data rate reaches the second data rate; requesting a network for data transmission at the second data rate without the diversity reception when the first data rate reaches the second data rate; and receiving the data from the network.

Preferably, the program further causes the computer to execute the step of judging whether or not strength of the reception signal increases by performing the diversity reception based on the reception status data, when the first data rate does not reach the second data rate.

According to the present invention, since the mobile terminal is controlled in response to the reception status so as not to perform the diversity reception when the diversity reception is unnecessary, the low power consumption can be realized.

BRIEF DESCRIPTION OF THE DRAWINGS

These features of embodiments of the present invention will be described in more detail with reference to the accompanying drawings, in which:

FIG. 7 is a view of an example of a control for a detection of a data rate in the mobile phone according to the present embodiment;

FIG. 8 is a view showing a relationship between the data rate and a reception circuit setting value (RCS)

DESCRIPTION OF THE PREFERRED EMBODIMENTS

Preferred embodiments of the present invention will be described with reference to the accompanying drawings.

Figure 1:
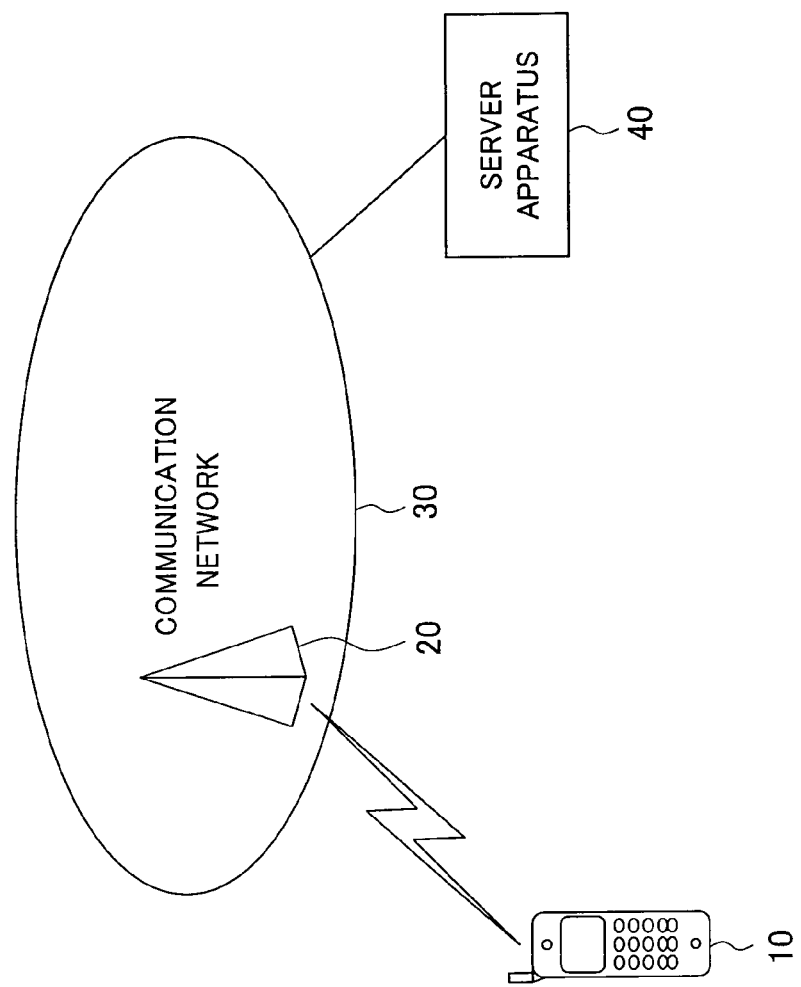
FIG. 1 is a view of a configuration of an embodiment of a wireless communication system applied with a mobile phone according to the present embodiment.

FIG. 1 is a view of a configuration of an embodiment of a wireless communication system applied with a mobile phone as a mobile terminal according to the present invention.

The mobile phone 10 according to the present embodiment, as shown in FIG. 1, requests a desired data passing through a base station 20 via a communication network 30 to a server apparatus 40 by using a wireless communication unit and displays Web data in response to the request on a display unit.

Note that, in the accompanying drawings, the mobile phone 10 may be abbreviated to "MS (mobile station)" and the base station 20 may be abbreviated to a "BS".

The mobile phone 10 according to the present embodiment has a main antenna, a sub antenna, and a reception system circuit, and performs a data communication of the EVDO method with the base station 20. In this process, the mobile phone 10 can selectively control whether or not the diversity reception (hereinafter, abbreviated to a diversity) should be performed to the reception signal received from the main antenna and the sub antenna.

In the EVDO method, based on data for reporting the reception status received from the mobile terminal, since the base station 20 switches a modulation method of a data for transmitting to the mobile terminal, a high-speed communication rate with low error immunity can be used when the reception status of the mobile terminal is good, and a low-speed communication rate with high error immunity can be used when the reception status is bad.

In downward (a direction from the base station to the mobile terminal) of the EVDO method, TDMA divides time into 1/600 second time unit. Only a single mobile terminal can communicate in the unit time. TDMA switches communication of a plurality of mobile terminals every unit time. Consequently, the data transmission can be performed with the maximum power for each of mobile terminals, which allows the data communication between terminals to perform with high speed.

Figure 2:
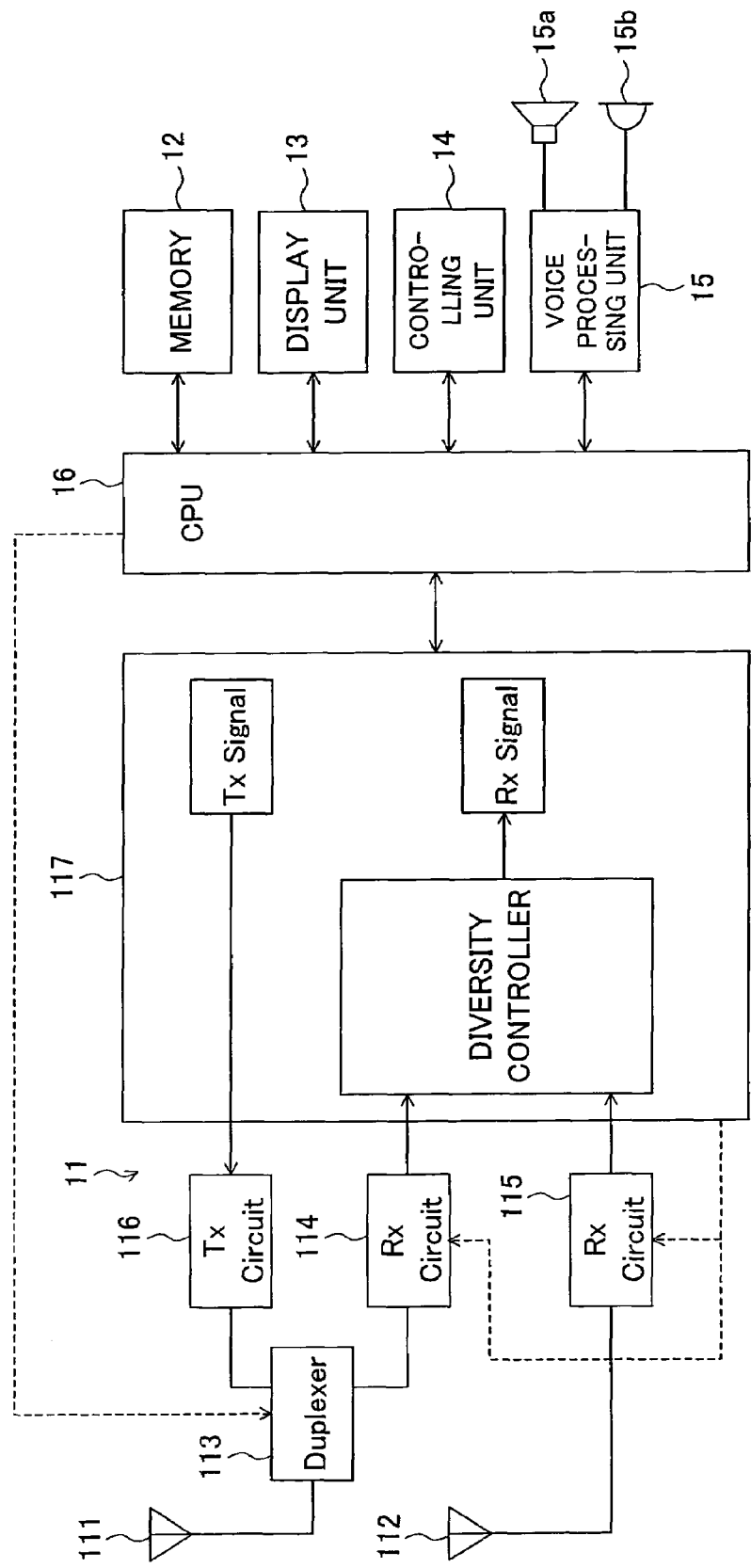
FIG. 2 is a block view of a configuration of an embodiment of the mobile phone according to the present embodiment.

FIG. 2 is a block view of a configuration of an embodiment of the mobile phone 10 as the mobile terminal according to the present invention.

The mobile phone 10 according to the present embodiment has a wireless communication unit 11, a memory 12 as a storage unit, a display unit 13, an operation unit 14, a voice processing unit 15 including a speaker 15a and a microphone 15b, and a CPU 16 as shown in FIG. 2.

Note that, the wireless communication unit 11 and the CPU 16 correspond to an embodiment of a reception controlling unit of the present invention.

The wireless communication unit 11, in order to perform a wireless communication using a radio wave, modulates an image data, a voice data, an e-mail data or other various data processed by the CPU 16, and transmits the result passing through a transmission-reception antenna to the communication network 30 including the base station 20.

Also, the wireless communication unit 11 receives an image data, a voice data, or an e-mail data transmitted via the communication network 30 and the base station 20 from the server apparatus 40 passing through the transmission-reception antenna, modulates the various received data, and outputs the result to the CPU 16.

The wireless communication unit 11, for example, as shown in FIG. 2, has a main antenna 111, a sub antenna 112, a duplexer 113, a first reception circuit 114, a second reception circuit 115, a transmission circuit 116, and a base band unit 117.

Note that, the main antenna 111 and the first reception circuit 114, and the sub antenna 112 and the second reception circuit 115 are respectively embodiments of the reception systems according to the present invention.

The duplexer 113 switches a connection of the main antenna 111 to the first reception circuit 114 and the transmission circuit 116.

The transmission circuit 116 transmits a transmission data, which is supplied from the base band unit 117, via the duplexer 113 from the main antenna 111 to the base station 20.

The first reception circuit 114 and the second reception circuit 115 demodulate a reception signal (a pilot signal according to the EVDO method), which is received respectively from the main antenna 111 and the sub antenna 112, from a base-banded reception signal to the multiplexed signal by a demodulation method corresponding to the modulation method of the reception signal received from the base station 20.

Figure 3:
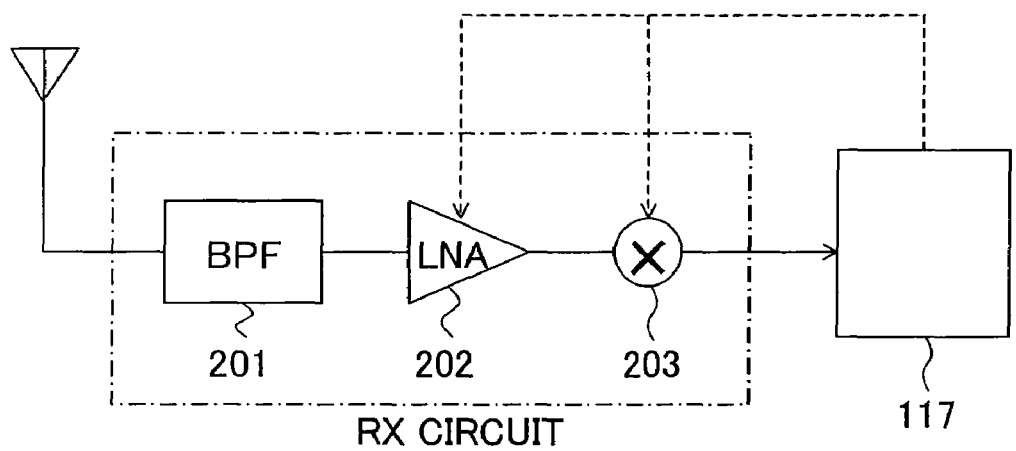
FIG. 3 is a block view of a configuration of an embodiment of a reception circuit.

FIG. 3 is a block view of a configuration of respective reception circuits.

As shown in FIG. 3, each of the reception circuits includes a band pass filter (BPF) 201 for preventing interference from an unnecessary frequency band, a low noise amplifier (LNA) 202 for amplifying the reception signal, and a mixer 203 for demodulating the base-banded reception signal to the multiplexed signal. In the present embodiment, the demodulation is performed by using one of QPSK, 8PSK, and 16QAM.

Further, the LAN 202 and the mixer 203 are controlled by the base band 117 to make power consumption changeable.

Specifically, the LAN 202 is controlled with a gain and a reference current. The gain control includes a processing of setting a gain mode on the software to set the gain with a plurality of steps, and the control of the reference current includes a processing of adjusting the reference current in the respective steps of the gain to amplify the LNA 202. The control of the reference current is performed by controlling the voltage applied to the LNA 202 to adjust the reference current in amplifying.

Further, the mixer 203 is similarly controlled with the applied voltage from the base band unit 117. As a result, by the base band unit 117, power consumption in a reception signal line can be variable.

Note that, the gain control in the plurality of steps performed by the base band unit 117 corresponds to an embodiment of the gain setting part according to the present invention, and the control of the reference current in the respective steps corresponds to an embodiment of the reference signal adjustment part according to the present invention.

The base band unit 117 inputs a reception data demodulated by the first reception circuit 114 and the second reception circuit 115 and performs a demodulation processing by a demodulator (not shown), specifically, performs a reverse spectrum spread to the reception multiplexed signal that is spread with spectrum.

The base band unit 117 controls whether or not a diversity reception should be performed by the CPU 16. If performing the diversity reception, the base band unit 117 mixes signals obtained from the first and second reception circuits 114 and 115 by a maximum ratio combining (MRC) algorithm or a least mean square (LMS) algorithm, and compensates a deterioration of reception efficiency when phasing occurs.

Here, if there is a reception data assigned to the mobile phone, for example, a communication signal from a communication partner or a data requested with a download, the base band unit 117 may output the reception data from a decoder to the CPU 16.

Further, the decoder obtains pilot strength (Ec/Io) in decoding processing.

The mobile phone using the CDMA method calculates field strength of the received multiplexed signal, and performs the reverse spectrum spread to calculate field strength of the reception signal assigned to the mobile phone. The Ec/Io indicates a ratio of the field strength of the multiplexed signal and the field strength of the reception signal assigned to the mobile phone. Note that, a pict image corresponding to a size of the Ec/Io is displayed on the display unit 13.

Note that, the decoder described above corresponds to an embodiment of the first calculating unit according to the present invention, and the Ec/Io corresponds to an embodiment of the reception status data according to the present invention.

Further, the base band unit 117 calculates a carrier to interference ratio (CIR) based on the following formula:

$$CIR=(Ec/Io)/(1-Ec/Io) \qquad (1)$$

The CIR obtained on the basis of the above formula is output from the decoder to a predictor (not show). The predictor predicts CIR value in the following reception slot timing (here, one slot is 1.66 ms=1/600 sec).

The prediction method in this process, which is not limited in the present embodiment, can be proposed with a linear prediction method as an example. Data instructing CIR of how many slots ahead should be predicted by the predictor is included in various control signals transmitted from the base station 20 at the timing of turning on a power source of the mobile phone 10. And the prediction CIR prepared by the predictor is supplied to a CIR-DRC converter (not shown).

The CIR-DRC converter calculates DRC based on a CIR-DRC conversion table (not shown). The DRC (data rate control bit) is defined as the maximum data rate which is expected from CIR and receivable in the mobile phone 10 at no more than a predetermined error rate. Here, in the CIR-DRC conversion table, DRC corresponding to a fluctuation of CIR is defined. In the CIR-DRC conversion table, DRC is decided depending on whether CIR is an upward trend, a downward trend, a high level, or a low level. Namely, the base band unit 117 observes the fluctuation of the CIR and the CIR-DRC converter successively calculates DRC.

Note that, the CIR-DRC converter described above corresponds to an embodiment of the second calculating unit according to the present invention, and DRC corresponds to an embodiment of the first data rate according to the present invention.

The base band unit 117, in response to data requesting effect of the diversity reception (REQ_div), supplies to the CPU 16 with data (DATA_div) indicating effect (fluctuation of Ec/Io) when performing the diversity reception.

The base band unit 117, based on the reception circuit setting value (RCS) from the CPU 16, sets a control value that is necessary to the LNA 202 and the mixture 203 in the respective reception circuits (the first reception circuit 114 and the second reception circuit 115). Namely, the base band unit 117 performs a gain setting for the LNA 202 by software and a setting for applied voltage of the LNA 202 and the mixture 203 for adjusting the reference current.

The base band unit 117 controls whether or not the diversity reception should be performed based on a control signal from the CPU 16. Namely, the base band unit 117 performs a processing based on a multiplexed signal obtained from the main antenna 111 via the first reception circuit 114 when not performing the diversity reception, and performs the processing based on a multiplexed signal respectively obtained from the first reception circuit 114 and the second reception circuit 115 when performing the diversity reception.

The base band unit 117 multiplexes a data rate (ODR3 in description below) calculated by the CPU 16 and a transmission data by a multiplexer, encodes the result by an encoder, and outputs the result to the transmission circuit 116.

The memory 12 includes an EEPROM or other nonvolatile memory, and stores various data that is necessary to a processing of the CPU 16 in advance.

The display unit 13 has a liquid crystal display (LCD), an organic electroluminescent device, or other display device, and displays a telephone number, various messages, a text data, or other data input for a phone call function under the control of the CPU 16.

Further, the display unit 13, when displaying a Web page, displays a frame, an arrow, or other cursor instructing an update of a screen, for example, the following pages or a search start bottom, with a plurality of display formats based on the control of the CPU 16.

The operation unit 14 has an end-and-power-off key, a start key, and a plurality of keys corresponding to numbers, for example, zero to nine, and supplies the CPU 16 with a data input from a user by the operation of those keys.

The voice processing unit 15 has a voice processing circuit, and is connected with a speaker 15a for outputting a voice data and a microphone 15b for inputting a voice data for a phone call function.

The voice processing unit 15, in a wireless communication mode, performs a predetermined processing to a voice signal obtained by the microphone 15b and outputs the result to the CPU 16.

The voice processing unit 15 performs a predetermined processing to a voice data supplied by the CPU 16 and outputs the result from the speaker 15a.

The CPU 16 control's the entire operation of the mobile phone 10.

For example, the CPU 16 performs a control for a transmission and reception of various data in the wireless communication unit 11 by a wireless communication, a processing of a voice data to the voice processing unit 15, a display of a data on the display unit 13, a control for changing a display format of the cursor, a control of light in the display unit 13, a processing in response to the data input from the operation unit 14, and a control of an access to the memory 12.

The CPU 16 controls whether or not the diversity reception should be performed to the base band unit 117. Namely, the CPU 16 judges whether or not the diversity reception should be performed based on a reception status due to Ec/Io, an amount of data obtained from the network, and DRC, and sends a control signal to the base band unit 117.

The CPU 16 executes a data rate calculation program (hereinafter, abbreviated to a "DRC program") for sirially calculating a suitable data rate corresponding to a reception environment and a reception status based on the reception data (Ec/Io, DRC, or other data descried above) supplied from the base band unit 117.

The CPU 16 sends data rates ODR1 to ODR3, which are executed results of the DRC program, and the reception circuit setting value (RCS) for realizing the data rate to the base band unit 117. A processing of the DRC program will be described below.

Next, an operation of the wireless communication system according to the present embodiment will be described with reference to FIG. 4 to FIG. 6.

Figure 4:
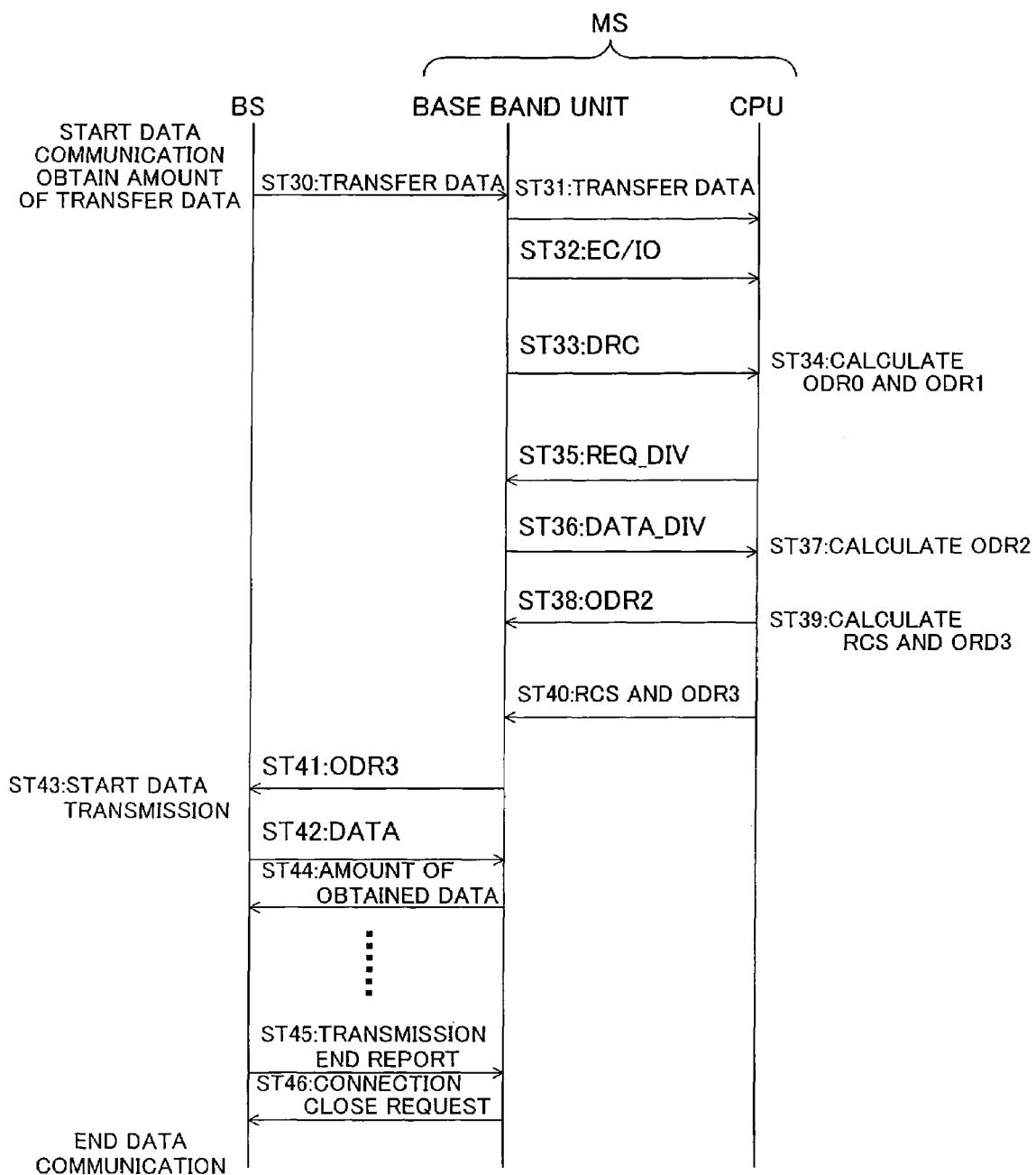
FIG. 4 is a view showing a data flow between a base station and a mobile phone in the wireless communication system according to the present embodiment.

FIG. 4 is a view showing a data flow between the base station (BS) 20 and the mobile phone (MS) 10. FIG. 5 is a flow chart of a processing of the base station (BS) 20. FIG. 6 is a flow chart of a processing of the mobile phone (MS) 10.

Note that, FIG. 4 also shows a data flow between the base band unit 117 and the CPU 16 inside the mobile phone (MS) 10. Here, the CPU 16 mainly executes the DRC program based on an input data.

Figure 5:
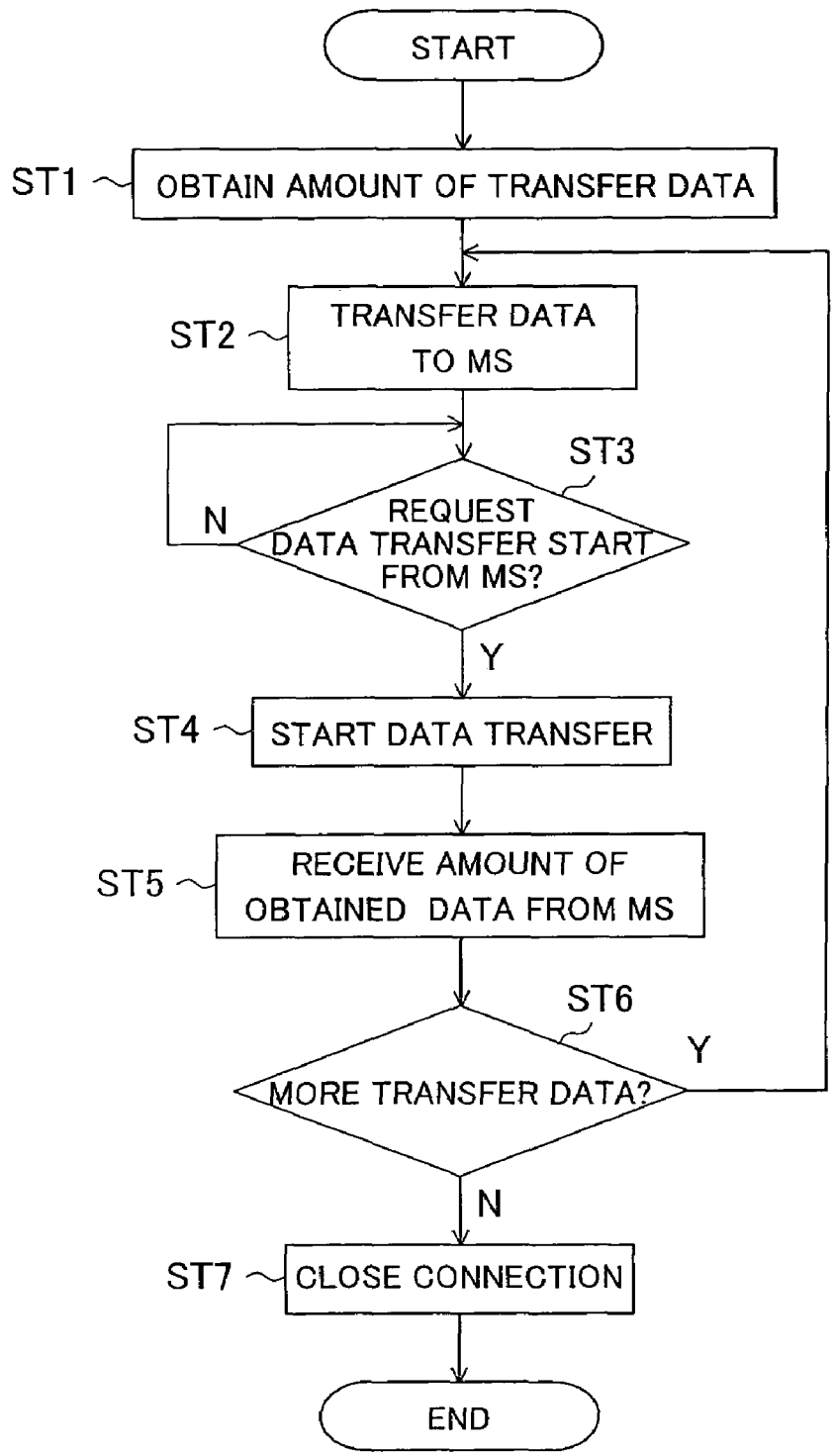
FIG. 5 is a flow chart of a processing of the base station (BS)

In FIG. 4, when a processing for obtaining a data to be downloaded from the server apparatus 40 via the communication network 30 is started, the base station 20 sends a transfer data including an amount of the transfer data to the mobile phone 10, for example, at a header data format along a FAT formation (step ST30 in FIG. 4, and steps ST1 and ST2 in FIG. 5).

Figure 6:
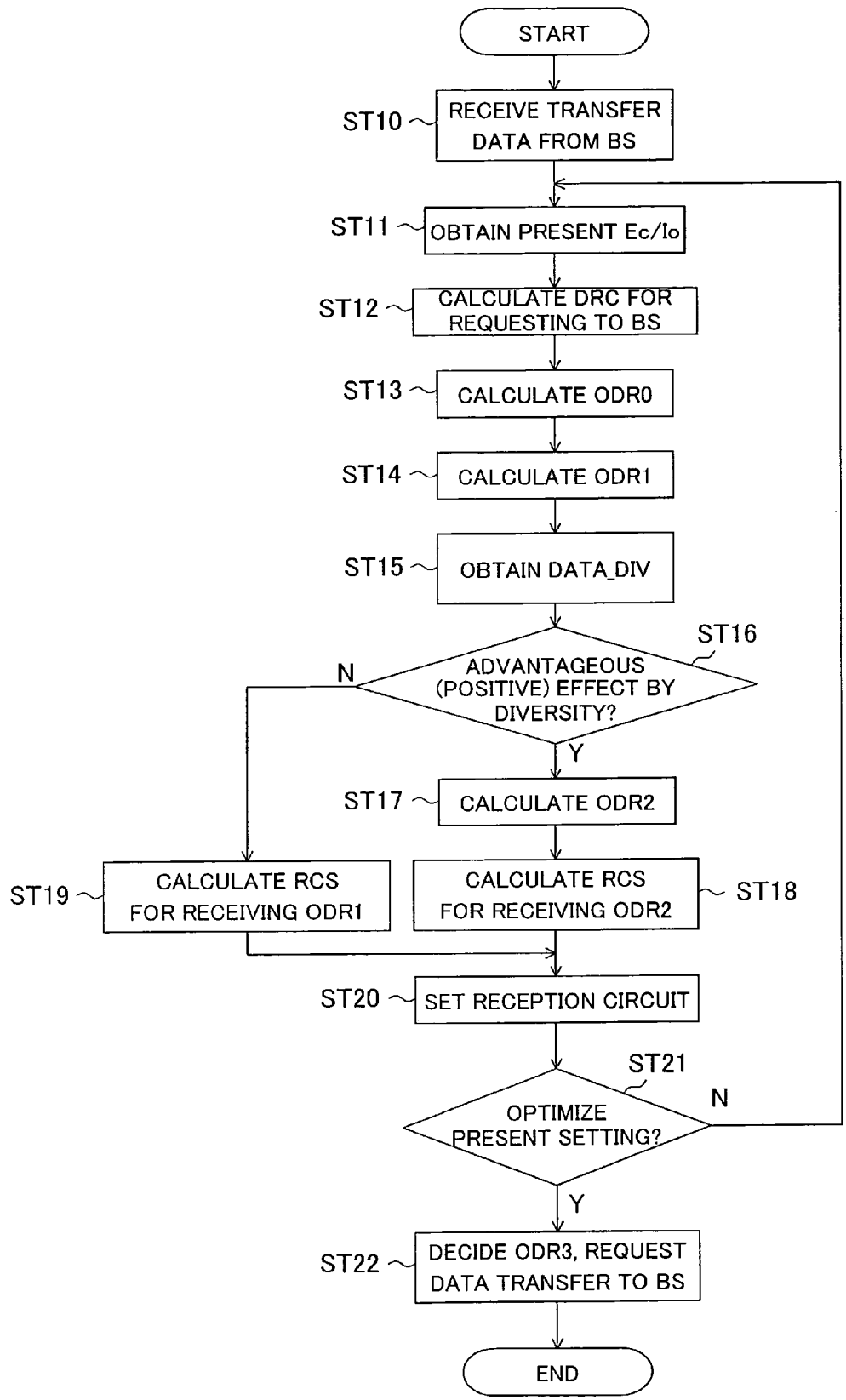
FIG. 6 is a flow chart of a processing the mobile phone (MS)

The mobile phone 10 receives the transfer data from the base station 20 (step ST10 in FIG. 6). Note that, in an initial status of the flow shown in FIG. 4, the mobile phone 10 receives the transfer data without the diversity reception.

The mobile phone 10 receives the transfer data at the base band unit 117 (step ST10), sends the transfer data to the CPU 16 (step ST31 in FIG. 4) and calculates Ec/Io (step ST11 in FIG. 6), and sends the result to the CPU 16 (step ST32 in FIG. 4).

Further, the base band unit 117 calculates CIR from the calculated Ec/Io based on the formula (1) described above, with referring to the CIR-DRC conversion table based on a fluctuation of CIR, calculates DRC as the maximum data rate, which is receivable by the mobile phone 10 at no less than a predetermined error rate (step ST12 in FIG. 6), then sends the calculated DRC as a desirable value of the downward data rate in the following downward time slot to the CPU 16 (step ST 33 in FIG. 4).

Note that, a general mobile phone using the EVDO method transmits DRC to the base station 20 in order to determine a data rate at the time of a data transmission from the base station 20, however, the wireless communication system of the present embodiment may not transmit the unprocessed DRC to the base station 20 in this step.

Then, a data rate ODR0 as a threshold for determining a data rate in response to the reception status and the amount of the transfer data and a data rate ODR1 based on the threshold are calculated (step ST 34 in FIG. 4).

FIG. 7 is a view of an example of a control for determining the data rate in the mobile phone 10 according to the present embodiment.

In an example shown in FIG. 7, "A" indicates an excellent reception status defined by Ec/Io, for example, three lines are displayed by a pict image based on a predetermined threshold corresponding to Ec/Io. "B" indicates a good reception status defined by Ec/Io, for example, two lines are displayed by the pict image based on the predetermined threshold corresponding to the Ec/Io. Note that, the pict image is one of icons displaying a radio wave status (signal strength) on the display unit 13 in order to report the status to a user, and, for example, it is displayed depending on the status from "unstable" to "excellent" by using zero line to three lines or using a text "out of service area".

The DRC program, based on Ec/Io and the amount of the transfer data, calculates a necessary and sufficient data rate ODR0 (step ST13 in FIG. 6). This is calculated to make ODR0 larger if Ec/Io and the amount of the transfer data are larger. In the example shown in FIG. 7, when the reception status defined by Ec/Io is excellent, ODR0 is calculated at 500 kbps in the case where the amount of the transfer data is no less than 1 M bytes.

Note that, ODR0 corresponds to an embodiment of the second data rate according to the present invention.

Further, the DRC program calculates ODR1 based on the result compared with ODR0 and DRC (step ST14 in FIG. 6). Namely, ODR1 is set to ODR0 when ODR 0 is larger than DRC, and DRC is set to ODR0 when ODR0 is smaller than DRC. That is, ODR1 is selected as the smaller one out of ODR0 and DRC to avoid a selection of an unnecessary high-speed data rate and a waste of power.

For example, in FIG. 7, when the reception status defined by Ec/Io is excellent and the amount of the transfer data is no less than 1 M bytes, ODR0 is calculated at 500 kbps, so that ODR1 is set to 500 kbps when DRC is not less than 500 kbps, or ODR1 is set to the same value as DRC when DRC is less than 500 kbps.

Then, the CPU 16 decides whether or not REQ_div should be provided, and provides REQ_div to the base band unit 117 in response to the decision (step ST 35 in FIG. 4).

In FIG. 7, when the reception status defined by Ec/Io is excellent, despite the value of ODR1, the CPU 16 decides that the diversity reception is unnecessary and does not provide REQ_div. When the reception status defined by Ec/Io is good, if DRC is less than ODR0, since it may be possible that Ec/Io increases due to the diversity reception, the CPU 16 provides REQ_div.

In response to REQ_div, the base band unit 117 checks whether or not Ec/Io increases when performing the diversity reception or not performing it, and outputs the result as a DATA_div to the CPU 16 (step ST 36 in FIG. 4 and step ST15 in FIG. 6).

In the DRC program, when deciding that Ec/Io does not increase due to the diversity reception based on DATA_div (step ST16 in FIG. 6), ODR1 calculated in step ST14 in FIG. 6 is set to a final request data rate (data rate to be requested). The CPU 16 sets the ODR1 as a final request data rate and outputs it to the base band unit 117.

Then, in the DRC program, when deciding that Ec/Io increases due to the diversity reception (step ST16 in FIG. 6), ODR2 is calculated similar to the calculation of ODR1 (step ST37 in FIG. 4, and step ST17 in FIG. 6). Namely, DRC is calculated based on new Ec/Io increased by the diversity reception. Then ODR2 is calculated based on the DRC similar to the calculation of ODR1 at step ST14.

The CPU 16 outputs ODR2 calculated by the DRC program to the base band unit 117 (step ST38 in FIG. 4).

Note that, ODR2 corresponds to an embodiment of a third data rate according to the present invention.

Then, in the DRC program, despite whether or not the diversity reception should be performed, a reception circuit setting value (RCS) for optimality controlling the reference current of the reception circuit (the first reception circuit 114 and the second reception circuit 115) is calculated based on ODR1 or ODR2 calculated above (step ST39 in FIG. 4, steps ST18 and ST19 in FIG. 6). Specifically, the RCS is used for a gain setting with a plurality of steps for the LNA 202 of the reception circuit and an adjustment of the reference current by controlling an applied voltage for the LNA 202 and the mixer 203. Consequently, by obtaining optimality RCS, power consumption in the reception circuit can be decreased.

A calculation processing for the RCS will be described in the following.

FIG. 8 is a view showing a relationship between the data rate and RCS. In the drawing, the data rate is set to A<B< . . . <L<M, a setting of a gain step is set to GAIN_0<GAIN_1<GAIN_2, and a current consumption in the reception circuit is set to I_0_R0>I_0_R0> . . . >I_2_R3>I_2_R4. Namely; when the request data rates (ODR0, ODR1) are small, that is, when the reception status is poor, the gain of the LNA 202 has to be made increase for that, consequently the current consumption increases. On the other hand, when the request data rates (ODR0, ODR1) are large, the gain of the LNA 202 is not required to be increased, consequently the current consumption decreases.

Further, in the same gain step, for example GAIN_0, the reference current is controlled so as to be controllable for the current consumption accurately. For example, when the reference current adjustment value is changed from REF_0 via REF_1 to REF_2 in the case of the gain step of GAIN_0, the current consumption slightly increases.

Figure 9:
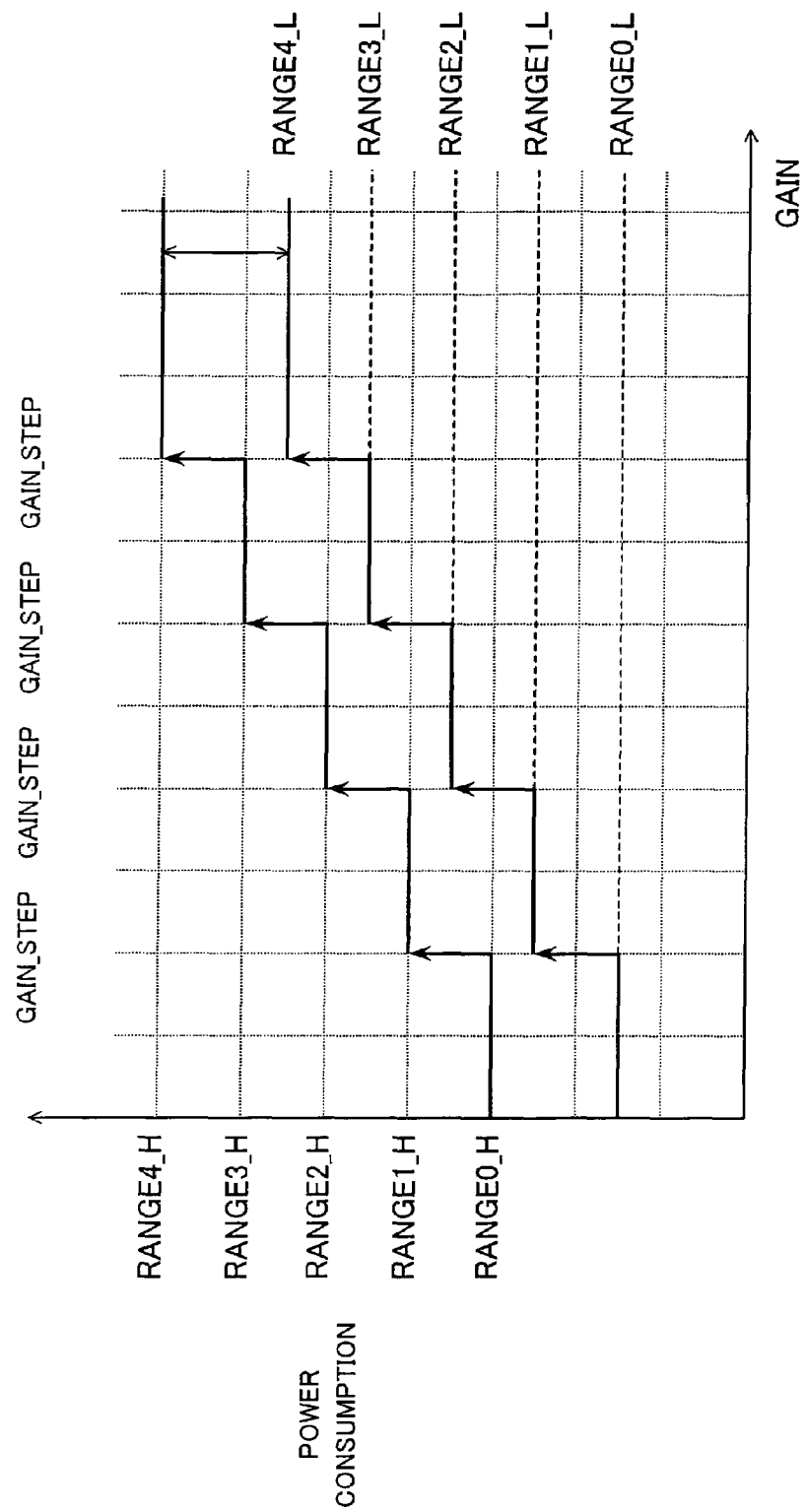
FIG. 9 is a view showing a relationship between a gain and power consumption in a calculation processing of RCS.

FIG. 9 is a view showing a relationship between the gain and the power consumption in the calculation processing of RCS.

As shown in FIG. 9, in the gain setting in the respective steps, the power consumption has ranges of RANGE0_L to RANGE0_H, RANGE1_L to RANGE1_H, RANGE2_L to RANGE2_H, RANGE3_L to RANGE3_H, and RANGE4_L to RANGE4_H, and can be adjusted in the respective ranges by adjusting the reference current.

In an initial status of a data communication processing (an initial status of the flow in FIG. 4), for example, GAIN_5 and REF_5 are set so that the LNA 202 in the reception circuit is set to the lowest gain, namely, the power consumption is made minimum.

RCS is calculated from a table data as shown in FIG. 8 based on the calculated ODR0 or ODR1.

In this process, first, GAIN_5 and REF_5 are set in the initial status, so GAIN_5 is held and REF_5 is changed to REF_5, REF_4, . . . , and whether or not the corresponding data rate satisfies ODR0 or ODR1 is checked serially. When not satisfying ODR0 or ODR1 only by adjusting the reference current, the setting of the gain step is changed from GAIN_5 to GAIN_4, then similarly the reference current is changed, and whether or not satisfying ODR0 or ODR1 is checked serially.

As described above, RCS obtained with the lowest gain satisfying ODR0 or ODR1, namely, the smallest power consumption, is calculated.

On the other hand, the RCS may be set so that the gain becomes the maximum at the initial status, and may be calculated by successively reducing the gain setting so as to obtain the lowest gain that ODR0 or ODR1 permits.

In this way, RCS calculated by the DRC program is outputs to the base band unit 117 by the CPU 16 (step ST40 in FIG. 4). The base band unit 117 changes the gain setting to the LNA 202 in the reception circuit and adjusts an applied voltage to the LNA 202 and the mixer 203 to change the reference current (step ST20 in FIG. 6).

Note that, if changing the gain of the LNA 202 in the reception circuit, Ec/Io calculated by the base band unit 117 may fluctuate a little. Therefore, the processing of steps ST11 to ST21 in FIG. 6 may be performed whenever updating RCS (step ST21 in FIG. 6). As a result, ODR3 can be obtained as an optimality data rate corresponding to the setting of the reception circuit.

For example, when ODR1 or ODR2 becomes almost the same value as ODR0 by changing RCS, it becomes known that a reception performance is not improved even if changing RCS moreover, and RCS may be decided at that time.

As above description, RCS and ODR3 serving as a final request data rate are decided, and the CPU 16 sends these data to the base band unit 117. The base band unit 117 reports the ODR3 as a downward predicted data rate to the base station 20, and requests the base station to start the data transfer (step ST22 in FIG. 6, and step ST41 in FIG. 4).

The base station 20 starts a transmission of a data to be downloaded (step ST4 in FIG. 5, and steps ST42 and ST43 in FIG. 4) when the mobile phone 10 requests the start of the data transmission (step ST3 in FIG. 5).

In the data transmission, namely in downloading, the mobile phone 10 observes the amount of the obtained data up to present, and transmits the amount of the obtained data to the base station (BS) 20 (step ST44 in FIG. 4, and step ST5 in FIG. 5). Then, based on the transfer data updated by the base station 20 (step ST6 in FIG. 5), the mobile phone 10 executes the processing of the flow chart shown in FIG. 6 in every predetermined intervals. As a result, the mobile phone 10 can serially calculate an optimality data rate in response to the transfer data.

Namely, the amount of the transfer data becomes decreased as a download progresses. Consequently ODR0, which is a smaller DRC, becomes a necessary and sufficient data rate. Therefore, RCS with lower power consumption can be set as the download progresses.

When the download is finished, the base station 20 transmits a transmission end report to the mobile phone 10 (step ST45 in FIG. 4). In response to this, the mobile phone 10 performs a connection close request (step ST46 in FIG. 4), then the base station 20 closes a connection (step ST7).

After performing the connection close request, the mobile phone 10 restores RCS to a default (GAIN_0 and REF_0) and terminates the diversity reception if setting the diversity reception.

As described above, the mobile phone 10 according to the present embodiment decides a necessary and sufficiently data rate ODR0 based on the transfer data including the amount of data to be downloaded and Ec/Io to be an index of the reception status, and decides whether or not the diversity reception should be performed based on a comparison result between the ODR0 and DRC which is the maximum data rate receivable at error rate less than the predetermined value. Consequently, the mobile phone 10 can suitably decide whether or not the diversity reception should be performed in response to the reception environment and reception status. Therefore, when deciding that the diversity reception is not necessary in terms of the reception environment and the reception status, since the diversity reception is not performed, and a waste of power can be avoided.

In this process, by performing the diversity reception, the base band unit 117 judges whether or not the reception status is improved, so the mobile phone 10 can be judge suitably whether or not the diversity reception should be performed even if an influence of multi-pass is small to not achieve a positive effect of the diversity reception.

The mobile phone 10 according to the present embodiment compares ODR0 with DRC, selects the smaller one, and sets the result as a request data rate (ODR2). Consequently, unnecessary high-speed data rate is not selected and a waste of electricity is avoided.

According to the mobile phone 10 of the present embodiment, in both of performing and not performing the diversity reception, the reception circuit is set so as to satisfy the request data rate (ODR2), so that the current consumption of the reception circuit can be made smaller to satisfy the ODR2.

According to the mobile phone 10 of the present embodiment, after setting the reception circuit, a final request data rate (ODR3) is calculated based on Ec/Io updated by the setting and reported to the base station 20, consequently the data rate can be set so as to make the current consumption of the reception circuit smallest in every data transmission.

According to the mobile phone 10 of the present embodiment, when setting the reception circuit, a processing for setting the gain with a plurality of steps and a processing for adjusting the reference current in the respective steps are combined and performed to LNA 202 in the reception circuit, so an output current of the LNA 20 can be controlled accurately. Namely, if performing only the processing for setting the gain in the plurality of steps, since the gain fluctuation in the respective steps may be large, the request data rate may not be satisfied and the gain may be made large drastically, consequently the power consumption may increase drastically. In such case, by using the mobile phone 10, the set gain is not changed and the reference current is adjusted to be able to set power consumption suitable for the request data rate.

Note that, the embodiment of the present invention is not limited to the above description, and can be changed with various modification within the point of the present invention.

For example, a time zone for performing the data communication may be considered when calculating ODR0.

Namely, a storage delivery or other push type data communication performed in midnight that traffic is unoccupied is not necessary to a high data rate, so ODR0 can be set smaller value than daytime. As a result, in the storage delivery, the diversity reception is not selected and a waste of power can be avoided.

Further, when the mobile phone 10 is connected via a battery charger to the AC adapter and operation power is supplied from the exterior power source, since it is not necessary to consider power consumption of a buttery, the diversity reception does not have to be terminated.

It should be understood by those skilled in the art that various modifications, combinations, sub-combinations and alterations may occur depending on design requirements and other factors in so far as they are within scope of the appeared claims or the equivalents thereof.

What is claimed is:

1. A mobile terminal comprising:
   a plurality of reception systems comprising an amplifier amplifying a reception signal;
   a first calculating unit for calculating a reception status data based on the reception signals;
   a second calculating unit for calculating a first data rate as a predicted data rate based on the reception status data; and
   a reception controlling unit comprising a reference signal adjusting part for adjusting the amplifier for changing an output signal of the amplifier,
   wherein the reception controlling unit does not perform a diversity reception when the first data rate reaches a predetermined second data rate,
   wherein the reception controlling unit, when the first data rate does not reach the second data rate, adjusts of the amplifier so that the first data rate and the second data rate are equal,
   wherein the reception controlling unit requests a network for data transmission at the second data rate when the first data rate reaches the second data rate.

2. A mobile terminal as set forth in claim 1, wherein said reception controlling unit obtains an amount of data received from a network and changes the second data rate based on the amount of the data.

3. A mobile terminal as set forth in claim 1, wherein said reception controlling unit changes the second data rate based on the reception status data.

4. A mobile terminal as set forth in claim 1, wherein the reference signal adjusting part changes the output signal by adjusting the reference signal of the amplifier.

5. A mobile terminal as set forth in claim 1, wherein the reception controlling unit further comprises a gain setting part for setting a gain with a plurality of steps to the amplifier.

6. A mobile terminal comprising:
   a plurality of reception systems;
   a first calculating unit for calculating a reception status data based on reception signals received through the plurality of reception systems;
   a second calculating unit for calculating a first data rate as a predicted data rate based on the reception status data; and
   a reception controlling unit for controlling whether or not a diversity reception should be performed based on the reception signals,
   wherein the reception controlling unit does not perform the diversity reception when the first data rate reaches a predetermined second data rate,
   wherein the reception controlling unit, when the first data rate does not reach the second data rate, judges whether or not strength of the reception signal increases by performing the diversity reception based on the reception status data,
   wherein the reception controlling unit, when the strength of the reception signal increases by performing the diversity reception, calculates a third data rate as a predicted data rate based on the reception status data in performing the diversity reception, and judges whether or not the third data rate reaches the second data rate.

7. A mobile terminal as set forth in claim 6, wherein said reception controlling unit requests a network for data transmission at the second data rate when the first data rate reaches the second data rate.

8. A mobile terminal as set forth in claim 6, wherein said reception controlling unit, when the strength of the reception signal does not increase by performing the diversity reception, does not perform the diversity reception.

9. A mobile terminal as set forth in claim 6, wherein:
   said reception system includes an amplifier amplifying the reception signal, and
   said reception controlling unit includes
   a gain setting part for setting a gain with a plurality of steps to the amplifier, and
   a reference signal adjusting part for adjusting a reference signal of the amplifier and changing an output signal of the amplifier,
   wherein said reception controlling unit, when the first data rate does not reach the second data rate, adjusts the reference signal of the amplifier so that the first data rate and the second data rate are equal, and requests a network for data transmission at the second data rate when the first data rate reaches the second data rate.

10. A data reception method for a mobile terminal having a plurality of reception systems to perform a diversity reception, said method comprising the steps of:
    calculating a reception status data based on a reception signal;
    calculating a first data rate as a predicted data rate based on the reception status data;
    adjusting an amplifier of the reception system so as to change an output signal of the amplifier;
    judging whether or not the first data rate reaches the second data rate;
    adjusting the amplifier so that the first data rate and the second data rate are equal, when the first data rate does not reach the second data rate;
    requesting a network for data transmission at the second data rate without the diversity reception when the first data rate reaches the second data rate; and
    receiving the data from the network.

11. A data reception method for a mobile terminal as set forth in claim 10, further comprising a step of:
    judging whether or not strength of the reception signal increases by performing the diversity reception based on the reception status data, when the first data rate does not reach the second data rate.

12. A data reception method for a mobile terminal having a plurality of reception systems to perform a diversity reception, said method comprising the steps of:
    calculating a reception status data based on a reception signal;
    calculating a first data rate as a predicted data rate based on the reception status data;
    judging whether or not the first data rate reaches the second data rate;
    requesting a network for data transmission at the second data rate without the diversity reception when the first data rate reaches the second data rate;
    judging whether or not strength of the reception signal increases by performing the diversity reception based on the reception status data, when the first data rate does not reach the second data rate;
    calculating a third data rate as a predicted data rate based on the reception status data in performing the diversity reception, when the strength of the reception signal increases by performing the diversity reception;
    judging whether or not the third data rate reaches the second data rate; and
    receiving the data from the network.

* * * * *